(12) United States Patent
Ozkara et al.

(10) Patent No.: US 12,312,068 B2
(45) Date of Patent: May 27, 2025

(54) TRANSMISSION SYSTEM

(71) Applicant: TUSAS—TURK HAVACILIK VE UZAY SANAYII ANONIM SIRKETI, Kahramankazan/Ankara (TR)

(72) Inventors: Mustafa Ozkara, Kahramankazan/Ankara (TR); Ibrahim Mert Kilic, Kahramankazan/Ankara (TR); Ali Gezer, Kahramankazan/Ankara (TR); Hamdi Alpay Kucuker, Kahramankazan/Ankara (TR); Emre Yaban, Kahramankazan/Ankara (TR)

(73) Assignee: TUSAS—TURK HAVACILIK VE UZAY SANAYII ANONIM SIRKETI, Kahramankazan/Ankara (TR)

( * ) Notice: Subject to any disclaimer, the term of this patent is extended or adjusted under 35 U.S.C. 154(b) by 0 days.

(21) Appl. No.: 18/711,085

(22) PCT Filed: Oct. 25, 2022

(86) PCT No.: PCT/TR2022/051179
§ 371 (c)(1),
(2) Date: May 16, 2024

(87) PCT Pub. No.: WO2023/096609
PCT Pub. Date: Jun. 1, 2023

(65) Prior Publication Data
US 2025/0026468 A1    Jan. 23, 2025

(30) Foreign Application Priority Data

Nov. 23, 2021 (TR) ................................ 2021/018330

(51) Int. Cl.
*B64C 13/36* (2006.01)

(52) U.S. Cl.
CPC .................................... *B64C 13/36* (2013.01)

(58) Field of Classification Search
CPC .......... B64C 13/36; B64C 13/26; B64C 13/24
See application file for complete search history.

(56) References Cited

U.S. PATENT DOCUMENTS

| 4,881,760 A | * | 11/1989 | Runkles | .................. F16L 23/04 |
| | | | | 285/373 |
| 4,900,070 A | * | 2/1990 | Runkles | ................ F16L 37/133 |
| | | | | 285/373 |

FOREIGN PATENT DOCUMENTS

| CN | 103123024 A | 5/2013 |
| CN | 206234522 U | 6/2017 |

(Continued)

OTHER PUBLICATIONS

International Search Report and Written Opinion for PCT application No. PCT/TR2022/051179, mailed Jan. 26, 2023.

(Continued)

*Primary Examiner* — Justin M Benedik
(74) *Attorney, Agent, or Firm* — Notaro, Michalos & Zaccaria P.C.

(57) ABSTRACT

A body separates areas on an air vehicle from each other. A plurality of pipes are located on both sides of the body in connection with the body and allow fluid to be transferred therethrough. An opening located on the body provides fluid passage between the pipes. A plurality of fasteners enable the pipes to be connected to each other and/or to the body. A flange extends outward from the pipe to allow the fasteners to be placed thereon. At least one sealing element is located between the flange and the body to provides sealing during the passage of the fluid between the pipes. A first pipe and a second pipe are connected on the body in an opposed manner such that the opening is therebetween.

13 Claims, 2 Drawing Sheets

(56) References Cited

FOREIGN PATENT DOCUMENTS

Figure 1:
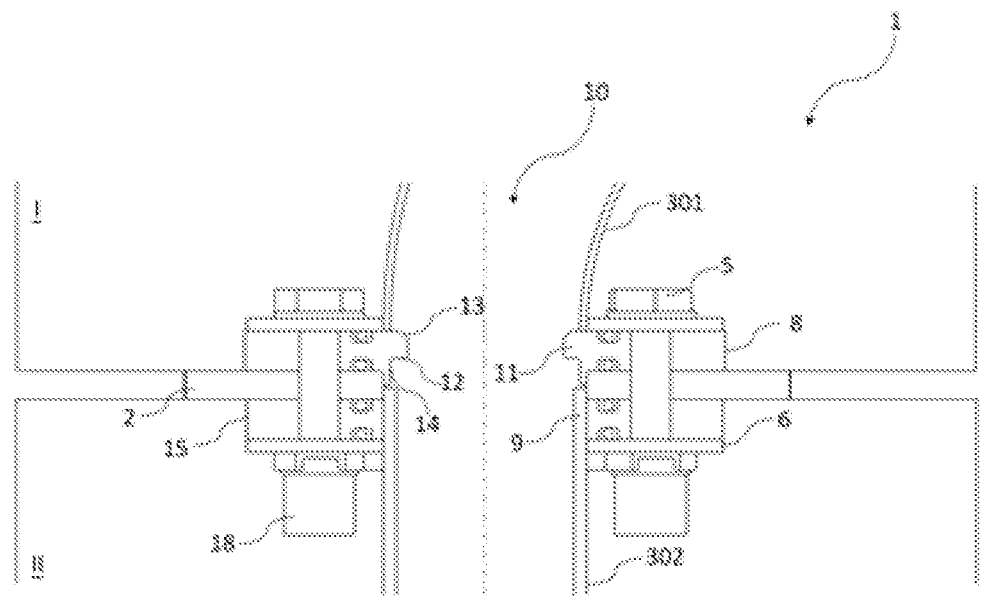

| | | | | |
|---|---|---|---|---|
| CN | 107269999 | A | 10/2017 | |
| CN | 206647653 | U | 11/2017 | |
| CN | 211259934 | U | 8/2020 | |
| EP | 2956699 | B1 * | 4/2019 | ............. B64D 37/32 |
| EP | 3492388 | A1 | 6/2019 | |

OTHER PUBLICATIONS

International Preliminary Report on Patentability for PCT application No. PCT/TR2022/051179, mailed Oct. 16, 2023.
Sep. 12, 2023 Demand for Chapter II for PCT application No. PCT/TR2022/051179with claim amendments.

* cited by examiner

TRANSMISSION SYSTEM

The present invention relates to a system which provide sealing in pipe passage processes between different areas in air and/or space vehicles.

Systems that carry fluids between different areas are provided on air and/or space vehicles. During a flight of the air vehicle, pressure of the environments containing people, such as the cabin and cockpit, is kept constant at values suitable for human health, while pressure value of other environments varies due to altitude or depending on the operation of the equipment. During a fluid transfer between the said areas, problem of fluid leakage between the areas due to the pressure difference can often occur, as well as leakage through the pipe-joint parts.

Chinese patent document CN211259934, which is included in the known-state of the art, discloses a system design that provides sealing between high pressure systems. In addition, it discloses gaskets provided in the system for sealing, and gasket slots for receiving the gaskets.

The other patent document U.S. Pat. No. 4,900,070A, which is included in the known-state of the art, discloses a coupling assembly for connecting adjacent ends of conduits, primarily used for aircraft fuel lines having redundant locking features is provided. This coupling can be manipulated with one hand and includes laterally spaced locking tines which engage raised elements for locking the coupling in secured relationship.

The other patent document U.S. Pat. No. 4,881,760A, which is included in the known-state of the art, discloses coupling assembly for connecting adjacent ends of conduits, primarily used for aircraft fuel lines having redundant locking features is provided. This coupling can be manipulated with one hand and includes a central tine and laterally spaced locking tines which engage a mating channel for locking the coupling in secured relationship. The coupling assembly can be manipulated with one hand and has viewing ports to be sure that all parts are in place.

The other patent document EP3492388A1, which is included in the known-state of the art, discloses a waste-gas line, and to an aircraft having a waste-gas line of said type. The waste-gas line have a first pipe section, which is connectable to the battery and which has an inlet end and a first flange; a separate second pipe section which has a second outlet end and a second flange; an inner sleeve and an outer sleeve, wherein the inner sleeve and the outer sleeve are composed of a non-conductive material.

The other patent document CN107269999A, which is included in the known-state of the art, discloses a disk pressure flange formula assembling pipe joint. The disk pressure flange formula assembling pipe joint of the present invention, with flange type pipe fitting, left tubing and right tubing, left tubing and right tubing Relative distribution and is connected by flange type pipe fitting.

The other patent document CN103123024A, which is included in the known-state of the art, discloses a method for connecting and sealing a steel-plastic composite steel pipe, a flange metal pipe and a pipe fitting, and further provides a device for connecting and sealing the steel-plastic composite steel pipe, the flange metal pipe and the pipe fitting.

The other utility model document CN206234522U, which is included in the known-state of the art, discloses a kind of vertical shaft whitewashing pipe connection. The vertical shaft whitewashing pipe connection includes be sleeved on it is upper whitewashing pipe outer wall on upper connecting tube, be sleeved on it is lower whitewashing pipe outer wall on lower connecting tube, Connect the connector of the upper connecting tube and lower connecting tube and be sleeved on the lower nozzle connected on inside pipe wall.

The European patent document EP2956699B1, which is included in the known-state of the art, discloses a bulkhead fitting capable of providing an electrically isolated pathway for transporting fluid across a structural boundary within an aerial platform and a method for electrically separating two fluid lines across a structural boundary is provided. The bulkhead fitting comprises a first component, a second component, and an isolator. The first component is attached to a first fluid line and a first side of a bulkhead. The second component is attached to a second fluid line and a second side of the bulkhead. The isolator is located between the first component and the second component within an opening in the bulkhead.

A transmission system according to the present invention provides a more efficient and reliable transfer of fluid between the pressure areas on the air and/or space vehicles.

Another object of the present invention is to perform fluid transfer on the air vehicle more effectively with an increased sealing.

A further object of the present invention is to provide a transmission system that performs the connection of pipes carrying fluid with each other and/or on the air vehicle in a safer and more practical way.

The transmission system realized to achieve the object of the invention, which is defined in the first claim and other claims dependent thereon, comprises an air vehicle that is an airplane; a body on the air vehicle, which separates the areas of the air vehicle with different pressures such that an area with a high pressure value remains on one side and another area with a low pressure value remains on the other side during a flight of the air vehicle; a plurality of pipes located in different pressure areas so as to be opposite to each other, thus allowing air or gaseous fluid to be transmitted between the areas; an opening located on the body between the pipes and allowing the fluid moving in the pipe to pass through the body; a plurality of fasteners that allow the pipe to be removably attached to another pipe and/or body; a flange located on the pipe so as to surround the pipe and extend outwards away from the transmission line, thus allowing the pipe to be fixed on the body by attaching fasteners thereon; at least one sealing element placed between the flange and the body in order to prevent the fluid from leaving the transmission line during its passage between the pipes. The body is located between engine area and a pressurized area of the air vehicle, such as cockpit and cabin, wherein pipes are provided on both sides thereof. Pipes are placed to cover both sides of the opening so that the fluid passes through the opening on the body while being transferred from one pipe to the other. During the flight of the air vehicle, pipes are located in areas with different pressures and outer walls of the pipes are exposed to different pressure values. A fluid pressure value in the pipe may be different from the pressure of the area where the pipe is located. Movement of the fluid in the pipe can be provided by any device such as a pump.

The transmission system according to the invention comprises a passage element on the air vehicle (V), which is located between the first pipe and the second pipe located in an environment for which pressure value is predetermined by the user, so as to prevent the fluid from leaving the transmission line, wherein the passage element enables the flow in the pipe to be regulated and enhances the sealing; a second pipe which is located opposite the first pipe, on the other side of the body, and provides transfer of fluid to the first pipe through the opening; an inner sealing extension extending over the second pipe towards the passage element in contact with a wall of the opening, thereby allowing transfer of fluid in the second pipe substantially to the first pipe. Fluid between the pipes may be a fluid preferably in the form of air or gas. The passage element and the inner sealing extension are positioned to contact with each other almost at the midpoint of the wall of the opening located on the body. The inner sealing extension has a cylindrical form to surround the transmission line integrally with the pipe, and extends towards the first pipe over the flange on the second pipe. During a flow from the second pipe to the first pipe, the fluid first contacts the inner sealing extension and then the passage element. The inner sealing extension is hollow and has a diameter value that allows the inner sealing extension to be inserted into the opening as a tight fit so that there is almost no gap between the inner sealing extension and the opening.

In an embodiment of the invention, the transmission system comprises a transmission line surrounded by the pipe and/or passage element, allowing the fluid to be moved and directed therethrough; a ring-shaped protrusion with a smaller diameter than the pipe, which extends into the transmission line over the passage element to narrow a cross-section of the transmission line, thus reducing diameter of the area where the fluid moves, regulating the in-pipe flow when the fluid hits the protrusion, and reducing the unwanted acoustic effect. The protrusion is located on the passage element so as to surround the transmission line. The protrusion prevents the fluid movement at least partially, thereby directing the fluid hitting thereon. Balanced operation of the system is ensured by creating a vortex in the pipe and/or changing the fluid velocity/fluid pressure values through the protrusion.

In an embodiment of the invention, the transmission system comprises a first environment through which the first pipe located on a side of the body for which pressure value is determined by the user is connected to the body; a second environment with a pressure value lower than the first environment during the flight movement of the air vehicle, which contains the second pipe located on the other side of the body. The body is located on the air vehicle (V) so as to separate the first environment and the second environment. The first pipe passes through the first environment and the second pipe passes through the second environment, so that they are both connected to the body. The first pipe can communicate into the first environment and used to carry air into the pressurized area.

In an embodiment of the invention, the transmission system comprises a hitting surface on the protrusion that extends into the transmission line, almost perpendicular to an axis on which the passage element extends when mounted between the pipes, thereby allowing an amount of the fluid flowing from the second pipe to the first pipe to hit thereon; an inclined surface which enlarges diameter of the transmission line to adjust flow rate of the fluid just before entering the first pipe and to change direction of the fluid. With respect to the flow direction of the fluid moving from the second pipe to the first pipe, the part where the fluid first encounters the protrusion extends perpendicular to the flow, then the transmission line is expanded by reducing the protrusion diameter by means of an inclined surface.

In an embodiment of the invention, the transmission system comprises an extension on the passage element, which extends to be opposed to the inner sealing extension, and in contact with the wall forming a height of the opening on the body. Thanks to the contact of the extension with the inner sealing extension, area between the passage element and the second pipe is substantially enclosed.

In an embodiment of the invention, the transmission system comprises the extension located in contact with the inner sealing extension almost at the midpoint of the wall of the opening, thus ensuring that the connection area between the passage element and the second pipe remains opposite to the body, so that a sealing is provided. The extension and the inner sealing extension contact each other almost at the midpoint of the opening thickness. In this way, the point where the passage element and the second pipe contact each other stays in line with the body wall and at least partially prevents the fluid from escaping through the junction point, thereby enhancing the sealing.

In an embodiment of the invention, the transmission system comprises at least one support element located between the flange and the body, placed on the pipe so as to be opposite to the passage element, and providing enhanced sealing by enclosing the inner sealing extension in the form of a ring. The pipe is firmly gripped by the support element such that the pipe contacts the fluid on one side and contacts the support element on the other side. The passage element and the support element are positioned on different sides of the opening so that they are located in areas with different pressure values. The support element is located to surround the second pipe from the outside.

In an embodiment of the invention, the transmission system comprises a plurality of holes exposed on the support element and passage element so that a fastener can be passed therethrough; the fastener attached removably into the hole, thereby providing connection of the support element, passage element and the pipe with each other and with the body. Each fastener passes respectively through the holes provided on the flange, passage element and body in the second pipe and holes provided on the flange on the first pipe, so that it connects the listed components to each other.

In an embodiment of the invention, the transmission system comprises a plurality of slots located on the support element and passage element between the fastener and the transmission line, allowing a sealing element to be placed therein. The sealing element is mounted removably into the slot so as to remain between the passage element and the flange on the first pipe and/or the passage element and the body. In addition, there is a sealing element between the support element and the body and/or the support element and the flange on the second pipe. Using a sealing element during the assembly of different parts with each other aims to prevent the flow of fluid out of the transmission line.

In an embodiment of the invention, the transmission system comprises the sealing element, which is located between the pipe and the support element and/or the passage element, and is placed in the slot to surround the transmission line, thereby preventing the fluid leaking into the fastener edges from escaping out of the transmission line. When the support element, body and pipes are fixed to each other by means of a fastener, the sealing element having the feature of changing form by compression, ensures that the assembly gaps formed during the connection process are closed in an airtight manner.

In an embodiment of the invention, the transmission system comprises a plurality of nuts which are removably attached to the fasteners on a side closest to the second pipe, and ensure that the pipe is fixed by compression after the passage element of the fastener is passed through the body and support element. The nut is placed on the transmission system in contact with the second pipe.

In an embodiment of the invention, the transmission system comprises the nut which allows the fastener to be received therein through the opening on one end, and the other end of which is closed to prevent the fluid from leaking out, thus ensuring that the fluid leaking into the fastener area remains in the transmission line.

In an embodiment of the invention, the transmission system comprises the inner sealing extension located on the first pipe and the second pipe to enable the fluid to be surrounded by the pipe throughout its movement. Inner sealing extensions are located on both pipes and extend in contact with the wall of the body. Inner sealing extensions on the first pipe and the second pipe are located in contact with each other.

In an embodiment of the invention, the transmission system comprises a body which is a pressure bulkhead located between the aircraft engine bay and the cockpit. The body separates the parts with different pressure values from each other.

In an embodiment of the invention, the transmission system comprises the sealing element made of an elastomeric material. Therefore, it can be deformed by means of a compression force applied thereon, so that it closes the gap between the elements in an airtight manner.

Figure 2:
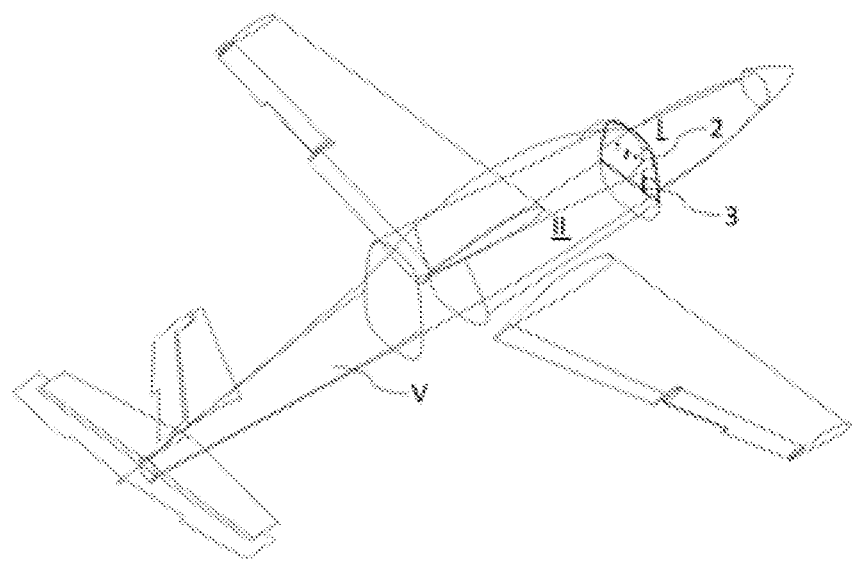
Figure 3:
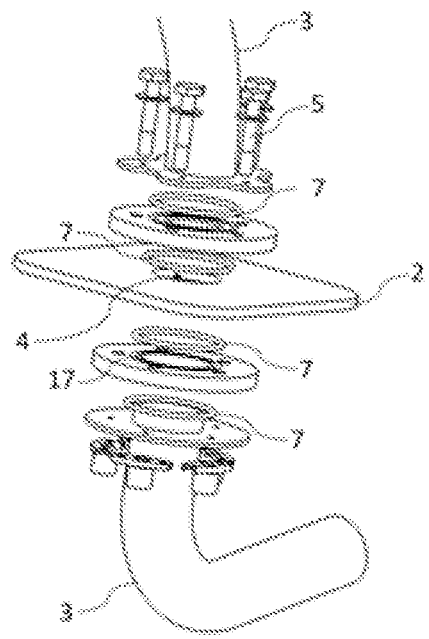
Figure 4:
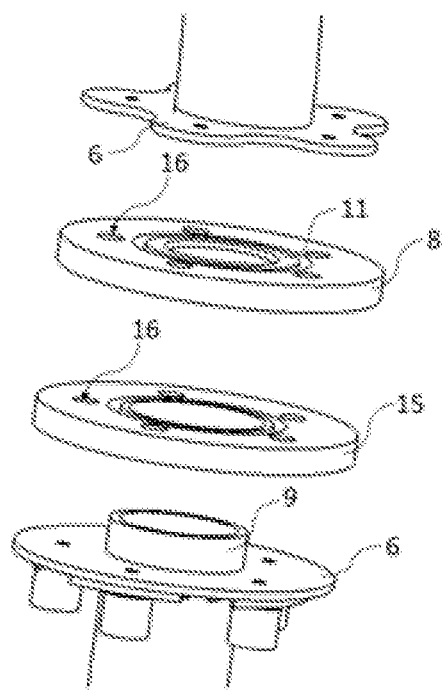

The transmission system realized to achieve the object of the present invention is illustrated in the attached drawings, in which:
 FIG. 1—is a schematic view of a transmission system.
 FIG. 2—is a perspective view of an air vehicle.
 FIG. 3—is an exploded view of a transmission system.
 FIG. 4—is a schematic view of pipe, passage element and support element.

All the parts illustrated in figures are individually assigned a reference numeral and the corresponding terms of these numbers are listed below:
 1. Transmission System
 2. Body
 3. Pipe
   301. First Pipe
   302. Second Pipe
 4. Opening
 5. Fastener
 6. Flange
 7. Sealing element
 8. Passage element
 9. Inner sealing extension
 10. Transmission line
 11. Protrusion
 12. Hitting Surface
 13. Inclined Surface
 14. Extension
 15. Support element
 16. Hole
 17. Slot
 18. Nut
 (V) Air vehicle
 (I) First environment
 (II) Second environment The transmission system (1) comprises an air vehicle (V); a body (2) separating the areas on the air vehicle (V) from each other; a plurality of pipes (3) located on both sides of the body (2) in connection with the body (2), which allow fluid to be transferred therethrough; an opening (4) located on the body (2) so as to provide fluid passage between the pipes (3); a plurality of fasteners (5) that enable the pipes (3) to be connected to each other and/or to the body (2); a flange (6) that extends outward from the pipe (3), allowing the fasteners (5) to be placed thereon; at least one sealing element (7) located between the flange (6) and the body (2), which provides sealing during the passage of the fluid between the pipes (3); a first pipe (301) and a second pipe (302), which are connected on the body (2) in an opposed manner such that the opening (4) is therebetween (FIG. 1).

The transmission system (1) according to the invention comprises a passage element (8) located between the first pipe (301) and the second pipe (302); the second pipe (302) that provides fluid transfer to the first pipe (301) through the opening (4); an inner sealing extension (9) extending over the second pipe (302) towards the passage element (8) so as to be in contact with the wall of the opening (4), thereby enabling the fluid in the second pipe (302) to be transferred substantially to the first pipe (301) (FIG. 2).

Thanks to the body, the areas on the air vehicle (V) that differ in pressure during flight are separated from each other. By means of pipes (3), the gaseous fluid located in different pressure areas is transferred between said areas. Since the opening (4) is located on the body (2) between the pipes (3), and the pipes (3) are positioned to close the opening (4) on both sides, the fluid moving in the first pipe (301) is transferred to the second pipe (302) by passing through the body (2). Therefore, the process of transferring the fluid, e.g. air, through environments with different pressure values is carried out.

The transition element (8) and the inner sealing extension (9) are positioned to contact each other almost at the midpoint of the wall of the opening (4) provided on the body (2). The inner sealing extension (9) is in the form of a hollow cylinder to surround the transmission line integrally with the pipe (2), and since it extends over the flange (6) on the second pipe (302) towards the first pipe (301), the fluid first contacts the inner sealing extension (9) and then the passage element (8) during its flow from the second pipe (302) towards the first pipe (301). Placing the inner sealing extension (9) in the opening (4) as a tight fit provides an enhanced sealing.

In an embodiment of the invention, the transmission system (1) comprises a transmission line (10) that allows the fluid to be transmitted by being surrounded by the pipe (3) and/or the passage element (8); a protrusion (11) with a narrower cross-section than the pipe (3), extending into the transmission line (10) over the passage element (8) so as to narrow the cross-section of the transmission line (10), and regulating the flow of the fluid hitting thereon. Thanks to the protrusion (11), the flow direction of the fluid moving in the pipe (3) can be changed. By means of the protrusion (11), velocity and pressure values of the fluid moving in the pipe (3) are changed, at least partially reducing the negative acoustic effects (FIG. 3).

In an embodiment of the invention, the transmission system (1) comprises a first environment (I) on one side of the body (2), into which the first pipe (301) extends and a pressure value of which is kept at a value predetermined by the user; a second environment (II) on the other side of the body, which has a pressure value lower than the first environment (I), and into which the second pipe (302) extends. The body (2) is located on the air vehicle (V) so as to separate the first environment (I) and the second environment (II). The first pipe (301) is connected through the first environment (I) and the second pipe (302) is connected through the second environment (II) on the body (2), such that they remain opposite each other. In this way, fluid transmission is performed to provide air tightness between two environments whose pressure values may differ from each other (FIG. 4).

In an embodiment of the invention, the transmission system (1) comprises a hitting surface (12) located on the protrusion (11), almost perpendicular to the movement direction of the fluid flowing from the second pipe (302) to the first pipe (301), wherein the hitting surface (12) extends into the transmission line (10) so as to allow the fluid to hit thereon; an inclined surface (13) which enlarges diameter of the transmission line (10) to adjust flow rate of the fluid just before entering the first pipe (301) and to change movement direction of the fluid. Thanks to the inclined surface (13), volume of the transmission line (10) is increased and velocity of the fluid is reduced. The flow is regulated by changing the velocity and pressure values of the fluid by hitting it on the hitting surface (12) and the inclined surface (13), respectively.

In an embodiment of the invention, the transmission system (1) comprises an extension (14) which is located on the passage element (8) and extends in contact with the wall of the opening (4), opposite to the inner sealing extension (9). Therefore, since the inner sealing extension (9) contacts the passage element (8), a reduction is provided in the ratio of indentation and roughness of the surfaces with which the fluid moving in the transmission line (10) will come into contact between the second pipe (302) and the first pipe (301).

In an embodiment of the invention, the transmission system (1) comprises the extension (14) located in contact with the inner sealing extension (9) almost at the midpoint of the wall of the opening (4), thus ensuring that the connection area between the passage element (8) and the second pipe (302) remains opposite to the body (2), so that a sealing is provided. Since the surface where the extension (14) and the inner sealing extension (9) contact is almost opposite to the midpoint of the wall of the body (2), the fluid is prevented from leaking out of the transmission line (10).

In an embodiment of the invention, the transmission system (1) comprises at least one support element (15) located between the flange (6) and the body (2), placed on the pipe (3) so as to be opposite to the passage element (8), and providing enhanced sealing by enclosing the inner sealing extension (9). The support element (15) is located in the second environment (II), and the passage element (8) is located in the first environment (I) symmetrically to each other with respect to the body (2). The support element (15) is connected to the second pipe (302) as a tight fit and provides an increase in sealing by surrounding the pipe (3) from the outside.

In an embodiment of the invention, the transmission system (1) comprises a plurality of holes (16) located on the support element (15) and the passage element (8), which allow a fastener (5) to be passed therethrough; the fastener (5) attached removably into the hole (16), thereby providing connection of the support element (15), passage element (8) and the pipe (3) with the body (2). The holes (16) are located opposite the hollow structures on the flange (6), so that each connector (5) is placed in contact with the first pipe (301), the passage element (8), the body (2) and the second pipe (302).

In an embodiment of the invention, the transmission system (1) comprises a plurality of slots (17) located on the support element (15) and the passage element (8) so as to be between the fastener (5) and the transmission line (10), and allowing the sealing element (7) to be placed therein. The sealing element (7) is mounted on the slot (17) in a removable way. By means of the slot (17), it is ensured that the sealing element (7) remains almost fixed in the position where it is placed on the support element (15) and/or the passage element (8).

In an embodiment of the invention, the transmission system (1) comprises a sealing element (7) between the pipe (3) and the support element (15) and/or the passage element (8), which is placed inside the slot (17) to seal the edges of the fastener (5), thereby enabling the fluid to stay substantially in the transmission line (10). The sealing element (7) is deformed when a force is applied thereon, and prevents fluid leakage through the structures it contacts.

In an embodiment of the invention, the transmission system (1) comprises a plurality of nuts (18) removably attached to the fasteners (5) on at least one end, which enable the fastener (5) passed through the pipe (3), the passage element (8), body (2) and the support element (15) to be fixed by compression. Thanks to the nut (18); pipes (3), passage element (8) and support element (15) are fixed on the body (2) so as not to move during flight.

In an embodiment of the invention, the transmission system (1) comprises the nut (18) which allows the fastener (5) to be received therein through one end, and the other end of which is closed, thus preventing the fluid that leaks into the fastener (5) area from leaking out of the transmission line (10). The nut (18) is located in the second environment (II) in contact with the second pipe (302), and provides sealing.

In an embodiment of the invention, the transmission system (1) comprises the inner sealing extension (9) located on the first pipe (301) and the second pipe (302), thereby enabling the fluid to be surrounded by the pipe (3) throughout its movement. The sealing extensions on both pipes (3) contact each other so that they are aligned with the wall of the body (2).

In an embodiment of the invention, the transmission system (1) comprises a body (2) which is a pressure bulkhead located between the aircraft engine bay and the cockpit. By means of the transmission system (1), air received from the aircraft engine area is transmitted to the cockpit area, which is the pressurized area. The first pipe (301) is surrounded by the first environment (I), e.g. the cockpit, and the second pipe (302) is surrounded by the second environment (II), e.g. the region where the engine is located.

In an embodiment of the invention, the transmission system (1) comprises a sealing element (7) made of an elastomeric material. Therefore, while mounting the nut (18) on the fastener (5), the sealing element is deformed elastically upon a force applied thereon, thereby enhancing the sealing.

The invention claimed is:

1. A transmission system (1) comprising:
   an air vehicle (V);
   a body (2) separating the areas on the air vehicle (V) from each other;
   a plurality of pipes (3) located on both sides of the body (2) in connection with the body (2), which allow fluid to be transferred therethrough;
   an opening (4) located on the body (2) so as to provide fluid passage between the pipes (3);
   a plurality of fasteners (5) that enable the pipes (3) to be connected to each other and/or to the body (2);
   a flange (6) that extends outward from the pipe (3), allowing the fasteners (5) to be placed thereon;
   at least one sealing element (7) located between the flange (6) and the body (2), which provides sealing during the passage of the fluid between the pipes (3);
   a first pipe (301) and a second pipe (302) of the plurality of pipes (3), which are connected on the body (2) in an opposed manner such that the opening (4) is therebetween;
   a first environment (I) on one side of the body (2), into which the first pipe (301) extends and a pressure value of which is kept at a value predetermined by the user;

a second environment (II) on the other side of the body, which has a pressure value lower than the first environment (I), and into which the second pipe (302) extends;

a passage element (8) located between the first pipe (301) and the second pipe (302);

wherein the second pipe (302) provides fluid transfer to the first pipe (301) through the opening (4);

an inner sealing extension (9) extending over the second pipe (302) towards the passage element (8) so as to be in contact with the wall of the opening (4), thereby enabling the fluid in the second pipe (302) to be transferred substantially to the first pipe (301);

a transmission line (10) that allows the fluid to be transmitted by being surrounded by the pipe (3) and/or the passage element (8); and a protrusion (11) with a narrower cross-section than the pipe (3), extending into the transmission line (10) over the passage element (8) so as to narrow the cross-section of the transmission line (10), and regulating the flow of the fluid hitting thereon.

2. A transmission system (1) according to claim 1, comprising a hitting surface (12) located on the protrusion (11), almost perpendicular to the movement direction of the fluid flowing from the second pipe (302) to the first pipe (301), wherein the hitting surface (12) extends into the transmission line (10) so as to allow the fluid to hit thereon; an inclined surface (13) which enlarges diameter of the transmission line (10) to adjust flow rate of the fluid just before entering the first pipe (301) and to change movement direction of the fluid.

3. A transmission system (1) according to claim 1, comprising an extension (14) which is located on the passage element (8) and extends in contact with the wall of the opening (4), opposite to the inner sealing extension (9).

4. A transmission system (1) according to claim 1, wherein the extension (14) is located in contact with the inner sealing extension (9) almost at the midpoint of the wall of the opening (4), thus ensuring that the connection area between the passage element (8) and the second pipe (302) remains opposite to the body (2), so that a sealing is provided.

5. A transmission system (1) according to claim 1, comprising at least one support element (15) located between the flange (6) and the body (2), placed on the pipe (3) so as to be opposite to the passage element (8), and providing enhanced sealing by enclosing the inner sealing extension (9).

6. A transmission system (1) according to claim 5, comprising a plurality of holes (16) located on the support element (15) and the passage element (8) which allow a fastener (5) to be passed therethrough; wherein the fastener (5) is attached removably into the hole (16), thereby providing connection of the support element (15), passage element (8) and the pipe (3) with the body (2).

7. A transmission system (1) according to claim 5, comprising a plurality of slots (17) located on the support element (15) and the passage element (8) so as to be between the fastener (5) and the transmission line (10), and allowing the sealing element (7) to be placed therein.

8. A transmission system (1) according to claim 5, wherein the sealing element (7) between the pipe (3) and the support element (15) and/or the passage element (8) is placed inside the slot (17) to seal the edges of the fastener (5), thereby enabling the fluid to stay substantially in the transmission line (10).

9. A transmission system (1) according to claim 5, comprising a plurality of nuts (18) removably attached to the fasteners (5) on at least one end which enable the fastener (5) passed through the pipe (3), the passage element (8), body (2) and the support element (15) to be fixed by compression.

10. A transmission system (1) according to claim 1, wherein the nut (18) allows the fastener (5) to be received therein through one end, and the other end of which is closed, thus preventing the fluid that leaks into the fastener (5) area from leaking out of the transmission line (10).

11. A transmission system (1) according to claim 1, wherein the inner sealing extension (9) is located on the first pipe (301) and the second pipe (302), thereby enabling the fluid to be surrounded by the pipe (3) throughout its movement.

12. A transmission system (1) according to claim 1, wherein the body (2) is a pressure bulkhead located between the aircraft engine bay and the cockpit.

13. A transmission system (1) according to claim 1, wherein the sealing element (7) made of an elastomeric material.

* * * * *